C. E. WOODS.
PROCESS OF PRESSING SOUND RECORDS.
APPLICATION FILED JULY 15, 1913.
1,151,642.
Patented Aug. 31, 1915.
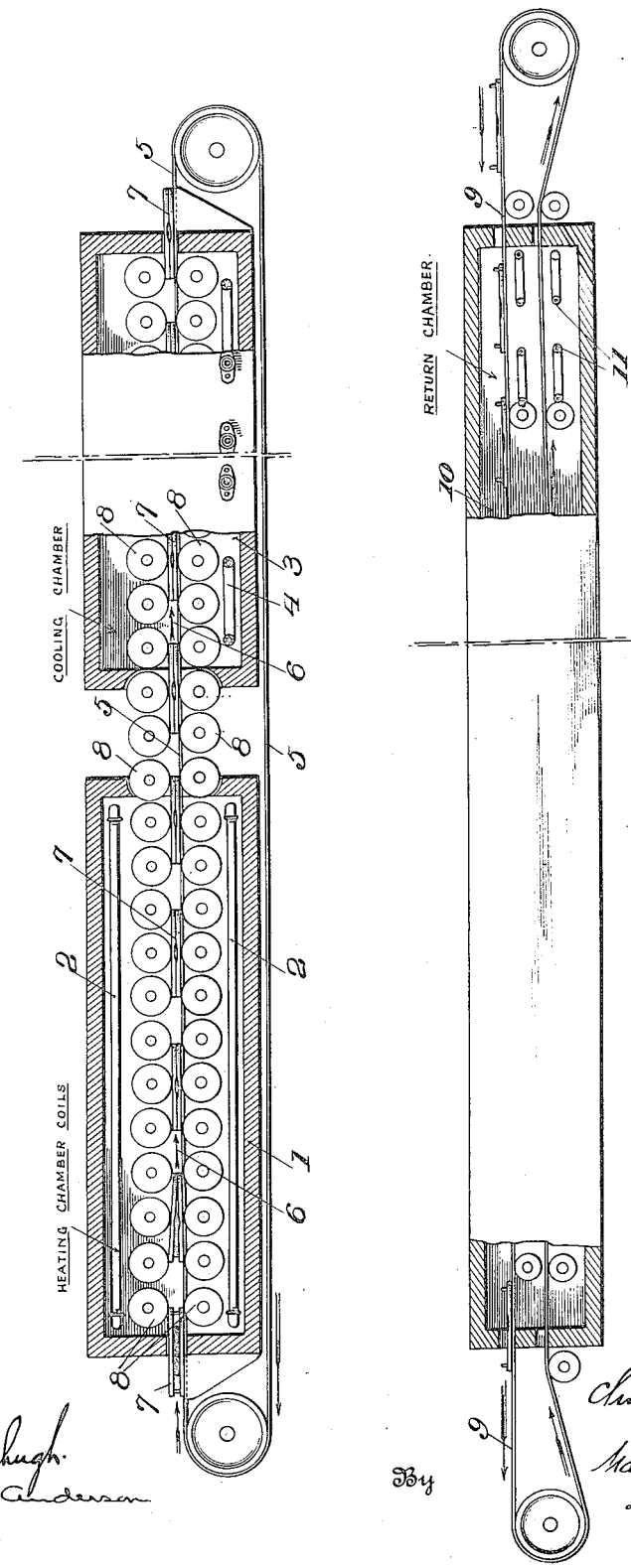
Inventor
Clinton E. Woods.

UNITED STATES PATENT OFFICE.

CLINTON E. WOODS, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

PROCESS OF PRESSING SOUND-RECORDS.

1,151,642.   Specification of Letters Patent.   Patented Aug. 31, 1915.

Application filed July 15, 1913. Serial No. 779,185.

*To all whom it may concern:*

Be it known that I, CLINTON E. WOODS, of Bridgeport, Connecticut, have invented a new and useful Process of Pressing Sound-Records, which invention is fully set forth in the following specification.

This invention relates to the art of pressing sound records, and has for its object to provide a process, in the practice of which the records may be efficiently pressed by the use of a matrix formed from the original sound record in any suitable manner in contact with plastic material capable of receiving the impression.

Heretofore in the practice of this art, it has been common to heat a suitable matrix and a suitable body of record material until such material became plastic, and then place the thermoplastic material on the matrix and subject the same to pressure while both the matrix and the record material are heated, and permit both the matrix and the material to slowly cool under pressure. This process consumes considerable time, since while it is not essential that the matrix and material should become absolutely cool, nevertheless the workman has to await a substantial cooling or reduction in temperature of the matrix and record material before removing the pressed record from the die.

My present invention is particularly designed to provide means whereby the records may be more rapidly pressed to the end that the number of pressmen employed in a factory of given capacity may be greatly reduced.

With this object in view, my invention consists in taking any suitable record matrix and any suitable record material capable of being rendered plastic by heat, and which I shall hereinafter refer to as thermoplastic material, placing said thermoplastic material when heated in contact with the heated matrix, and then passing said material and matrix through a heated chamber under pressure. In said chamber, which is preferably long and low, the temperature may be uniform throughout the extent of the chamber, or if desired, the temperature is lower at one end, say the entrance end, than at the exit end of the chamber and gradually increases from the entrance to the exit thereof. In some cases it may be found desirable to have the temperature highest at the entrance end and gradually decreasing to the outlet end. After the record and matrix pass from the heated chamber, they are then exposed to a cooling atmosphere while still under pressure. Preferably this cooling atmosphere is obtained by passing the matrix and the record under pressure through a cooling or refrigerating chamber, but if desired, the cooling may be effected by exposure to a cooling atmosphere, such as a cooling blast, or otherwise. The matrix and record having been sufficiently cooled or reduced in temperature, the matrix is then separated from the record which is then ready for finishing in the usual or any suitable manner.

Preferably, before placing the thermoplastic material in contact with the heated matrix, a suitable centrally disposed label is placed upon the matrix which thus becomes securely affixed by adhesion to the finished record as the result of the process described, this being a common and well-known step in the art.

In the practice of my method, various forms of apparatus may be employed, one of which, for convenience in illustrating and explaining the invention is diagrammatically shown in the accompanying drawing, in which 1 is a heating chamber heated in any suitable manner, as by means of the steam pipes 2 passing therein, thereunder or thereover, and 3 is a refrigerating chamber adjacent to the heating chamber 1 and provided with suitable pipes 4 for conducting a refrigerating material into the chamber. The chambers 1 and 3 are supported on any suitable frame-work, and a continuous carrier 5 of any suitable material, such as metal, and of any suitable construction, is caused to progress through the chambers 1 and 3 in the direction indicated by the arrow 6, so as to pass from the heating chamber 1 into the refrigerating chamber 3 and then return to again repeat the operation. This carrier is provided with a series of suitably placed dies 7 for the reception of the matrices with the thermoplastic material in contact therewith, (the matrices and the thermoplastic material having been previously heated to the desired temperature), and a die plate is placed over the material in the usual way, and as the carrier 7 passes into the heated chamber, or if desired, before passing into the heating chamber, it is subjected to the action of pressure rolls 8 which subject the matrices and the thermoplastic material to a uniform, or if desired a gradually increasing, pressure. Preferably there is a series of sets of rolls 8, as indicated in the drawing. As the carrier progresses, the matrices and the thermoplastic material pass from the exit end of the heating chamber into the refrigerating chamber, the two chambers being preferably spaced apart as indicated in the drawing, and if desired, a set of pressure rolls may be mounted in the space between the two chambers. The farther progress of the carrier advances the matrices and the thermoplastic material into the cooling or refrigerating chamber, where they are still subjected to the action of the pressure rolls, and upon their exit from the refrigerating chamber, the operator removes the pressed record and the matrix from the dies in the carrier and then proceeds to reheat the matrix for repeating the operation. A convenient and preferred means for thus reheating the matrices consists of a return carrier 9 leading from near the exit end of the refrigerating chamber to near the entrance end of the heating chamber, and means are provided for reheating the matrices as they effect their return journey. This reheating means may be of any suitable or desired character. The return carrier itself may be heated or it may be covered with or caused to pass through a suitable heating chamber 10 provided with the heating pipes 11, the temperature of the carrier or the chamber, as the case may be, being carefully regulated to the end that the matrix may have attained the desired temperature upon reaching the entrance end of the heating chamber, when the matrix is again placed in the dies on the carrier 5 with the thermoplastic material and the operation repeated.

While, for the purpose of clearly explaining the inventive idea, I have illustrated one form of apparatus which may be employed in practising my improved method of pressing sound records, I wish it to be distinctly understood that the invention is not in any way limited to the specific apparatus employed, since a variety of forms of apparatus may be used in practising the invention, without departing from the principle thereof.

By the use of my improved method, the number of workmen employed in pressing a given number of records is reduced from fifty to seventy-five per cent., and the uniformity in character of the resulting product greatly improved.

The apparatus shown and described herein is not specifically claimed in this specification, since it forms the subject-matter of another application.

Having thus described my invention, what is claimed is:—

1. The improved process of pressing sound records which consists in placing a heated matrix in contact with heated thermoplastic record material, passing the matrix and record material through a heated chamber under pressure, and then cooling the same.

2. The process of pressing sound records which consists in placing a heated matrix and heated thermoplastic record material in contact with each other, passing said matrix and material through a heated chamber under pressure, and then cooling said matrix and material under pressure.

3. The process of pressing sound records which consists in placing a heated matrix and heated thermoplastic record material in contact with each other, then passing said matrix and material through a heated chamber under pressure, and then cooling said matrix and material by exposing the same while under pressure to a cooling atmosphere.

4. The process of pressing sound records which consists in placing a heated matrix and a heated thermoplastic record material in contact with each other, then passing the matrix and material through a heated chamber under pressure, and then passing the same through a cooling chamber.

5. The process of pressing sound records which consists in placing a heated matrix and heated thermoplastic record material in contact with each other, passing said matrix and material through a heated chamber under pressure, and then passing said matrix and material under pressure through a cooling chamber.

In testimony whereof I have signed this specification in the presence of two subscribing witnesses.

CLINTON E. WOODS.

Witnesses:
THOMAS STEVENTON,
FRANK C. HINCKLEY, Jr.